(12) United States Patent
Laur et al.

(10) Patent No.: US 6,464,623 B1
(45) Date of Patent: Oct. 15, 2002

(54) TOOL STORAGE AND TOOL EXCHANGE DEVICE OF A MACHINING MACHINE-TOOL AND OPERATING PROCESS OF SUCH A DEVICE

(75) Inventors: Raymond Laur, Viviers les Montagnes; Gilles Sudre, Castres, both of (FR)

(73) Assignee: Renault Automation Comau, Meudon la Foret (FR)

( * ) Notice: Subject to any disclaimer, the term of this patent is extended or adjusted under 35 U.S.C. 154(b) by 0 days.

(21) Appl. No.: 09/349,230

(22) Filed: Jul. 8, 1999

(30) Foreign Application Priority Data

Jul. 9, 1998 (FR) .............................. 98 08794

(51) Int. Cl.[7] .............................................. B23Q 3/157
(52) U.S. Cl. .......................... 483/41; 483/40; 483/48; 483/51; 483/58
(58) Field of Search ............................ 483/44, 40, 45, 483/46, 48, 49, 51, 52, 53, 61, 41

(56) References Cited

U.S. PATENT DOCUMENTS

| | | | | |
|---|---|---|---|---|
| 3,161,951 A | * | 12/1964 | Anthony | 483/40 |
| 3,780,423 A | * | 12/1973 | Lillenthal et al. | 483/53 X |
| 4,343,077 A | * | 8/1982 | Satoh et al. | 483/41 |
| 4,833,770 A | | 5/1989 | Esser et al. | 483/30 |
| 5,169,373 A | * | 12/1992 | Horikawa | 483/40 |

FOREIGN PATENT DOCUMENTS

| | | | | |
|---|---|---|---|---|
| DE | 4033036 | * | 1/1992 | 483/41 |
| EP | 293509 | * | 12/1988 | 483/40 |
| EP | 319611 | * | 6/1989 | 483/41 |
| EP | 522498 | * | 7/1992 | 483/58 |
| EP | 0 522 498 A1 | | 1/1993 | |
| JP | 99280 | * | 8/1979 | 493/41 |
| JP | 356152549 | * | 11/1981 | 483/41 |
| JP | 71042 | * | 4/1983 | 483/41 |
| JP | 60-016332 | | 1/1985 | |
| JP | 63-74507 | * | 4/1988 | 483/41 |
| JP | 257143 | * | 10/1988 | 483/40 |
| JP | 0010736 | * | 1/1991 | 483/41 |
| SU | 1481025 | * | 5/1989 | 483/40 |

* cited by examiner

Primary Examiner—William Briggs
(74) Attorney, Agent, or Firm—Oblon, Spivak, McClelland, Maier & Neustadt, P.C.

(57) ABSTRACT

A tool storage and tool exchange device of a high speed machining machine-tool having a horizontal ram that receives a tool. The exchange device includes a tool storage module that has a multiplicity of housings receiving the tools, a handling module that loads or unloads at least one tool from a housing and transports the tool from the housing toward an exchange zone with a transfer module, and a transfer module that transports a tool present in the ram from an exchange zone with the ram toward the exchange zone with the handling nodule and vice-versa. The multiple modules allow simultaneous execution of different operations by a tool storage and tool exchange device.

32 Claims, 8 Drawing Sheets

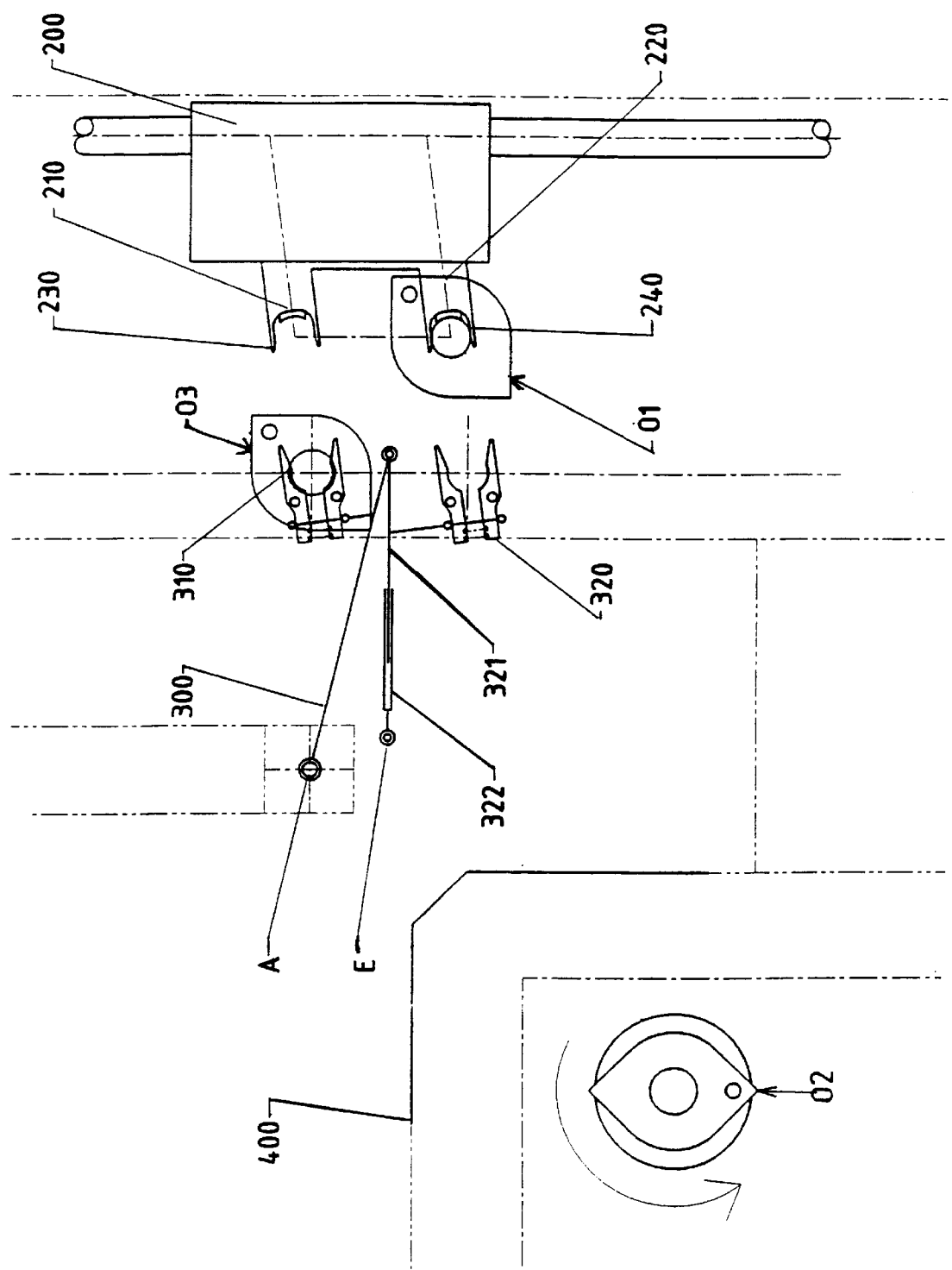

TOOL STORAGE AND TOOL EXCHANGE DEVICE OF A MACHINING MACHINE-TOOL AND OPERATING PROCESS OF SUCH A DEVICE

BACKGROUND OF THE INVENTION

1. Field of the Invention

The present invention relates to the field of machining and more particularly to modifications allowing to ensure the tool exchange of a machining machine-tool under the best conditions.

2. Discussion of the Background

Machine-tools which today ensure very high speed machining, reduce the amount of time spent both in machining and part transfer and thus the time the tool is in use. Very high speed machining thus defines new criteria or at least more restrictive criteria in the time allowed to exchange tools, loading or unloading on the spindle(s), as well as loading and unloading in the tool magazine.

In fact, the tool exchange device of a very high speed machining machine-tool must be able to ensure under the best conditions, the following functions:

unloading from the spindle of the tool just being used, its storage in a storage device, the engagement of the tool in a storage device, the loading of the tool on the spindle.

Another criterion to be added to that of speed is the quantity of tools offered by the said storage device. It is classical to use a rotary storage device so as to present the device ensuring the engagement of the tool as fast as possible with a free housing to house the tool having just been used, and after, by rotation of the device, to present the tool to use in the next machining stage.

Even though such a device, called with turret, answers perfectly to the needs of a machine-tool using a limited number of tools, it is not adapted to the case when the machining stage of the piece to be machined by the machine-tool, requires the use of a large number of tools.

It is nevertheless possible to make a larger number of tools accessible by doubling the number of turret devices which requires two tool exchange devices or at least doubles the space needed.

Amongst the turret devices, the rotary storage device described in the French patent No 2 748 225 which comprises a multiplicity of tools arranged on its periphery is known in the prior art. During tool exchange, the turret enters by rotation in the machining zone, a ram carrying a mobile electric spindle on three axes puts the tool having been used in the previous machining stage in an empty housing of the turret and takes, after a suitable rotation of the turret, the tool which is needed in the next machining stage.

The limitations of a turret device are as follows:

the number of tools is very limited, the rotary movements of a turret carrying a large number of tools should be ensured by an oversized motorisation, the turret should be of a very large diameter, the doubling of turrets is not enough to supply enough tools for some applications, the loading and unloading of tools during the function of machining is not possible, the ram waits for the rotation of the turret before it can take the tool needed to be used in the following machining stage.

In the prior art there also exists a device in which the tool housings are integral with one another as well as with a driving means, thus constituting a chain moving to present, at the level of the exchange zone between the storage device and the machining station, either the empty housing to retrieve a tool having been used, or a housing containing the tool to be used in the next machining stage. It is obvious that the number of tools can be very large for such a storage device. Nevertheless, this same number of tools also determines the speed to go from one tool housing to another. Consequently, the more tools there are, the slower the speed to ensure storage of the tool having been used and to bring to hand the tool to be used.

SUMMARY OF THE INVENTION

The research of the applicant have therefore been oriented towards a high capacity tool storage and tool exchange device respecting the speed criteria defined by very high speed machining.

The inconvenience of increasing the number of tools, in relation to a classical device of a classical tool exchange, is that it increases the amount of time needed to unload the tool as well as to bring it towards the exchange zone between the tool storage and tool exchange device and the ram, due to the fact of increasing the travelling distance. The applicant has thus carried out research to also reduce the time of the functions mentioned above, research which has led to the original conception of a particularly new and inventive high capacity tool storage and tool exchange device obviating the inconveniences mentioned above and offering optimised tool storage and tool exchange functions.

According to the main characteristic, the tool storage and tool exchange device of a high speed machining machine-tool comprising a horizontal ram receiving a tool on its end, is remarkable in that it is made of the following parts:

a tool storage module comprising, inside a sealed chamber, a multiplicity of aligned housings receiving the tools so that the axes of those tools are parallel with the axis of the ram and form part of a same vertical storage plane, a handling module which, moving in a vertical plane parallel with the tool storage vertical plane, ensures loading or unloading of at least one housed tool and its transport in the aforesaid chamber, along a direction parallel with the axis of the ram, from its housing towards an exchange zone with a third module and vice-versa, and a transfer module ensuring transport of the tool present in the ram from an exchange zone with the ram towards the exchange zone with the handling module to transmit the tool to it, and vice-versa.

This characteristic is particularly advantageous in that it adds an intermediary module in the movement of the tool from its storage zone to its zone of use. In fact, it is not the transfer module which ensures the loading or unloading of the tool in the storage module, but the handling module. Inversely, it is not the handling module which ensures passage of the tool from the storage zone to the ram, but the transfer module.

So, by adding an intermediary element, it is parfectly possible to realise most classical functions of a tool storage and tool exchange device at the same time.

So, for example, the transfer module of the tools ensures the removal of the tool carried by the ram and its replacement by another tool while the handling module places another tool in the storage magazine. Alternatively, while the transfer module is ensuring the replacement of a tool, the handling module can get a new tool from the magazine.

The addition of an intermediary module therefore allows to carry on and not stop the machining when the handling module unloads a tool having been used and/or finds another tool. Consequently, the size, volume or capacity in tools of the tool storage module conceived by the applicant, does not affect the speed of tool exchange of the device of the invention, as the route to unload, load and transport from the exchange zone, between the transfer module and the handling module, towards the tool storage module and vice-versa, is taken on by a module independant of the one which ensures transfer.

This disposition demarcates itself from the prior art devices which, as in the case of a turret, oblige machining to stop when the tool storage device is rotating to present a housing to take the tool which has just been used and another housing containing the tool to be used in the new machining stage.

Contrary to the storage devices of the prior art which had a tendency to group together all the functions in the one and same device, this new tool storage and tool exchange device concept is particularly inventive in that it separates the principal functions of such devices in three modules so that these modules can each function independently.

In addition, the arrangement in which the axes of tools arranged parallel to the axes of the ram, (the tools being oriented in the direction of the machining) garantees a minimum of additional movement during the transport and the tool exchange. This arrangement is particularly advantageous in that the change of direction of a tool for transport means can require some significant speed increases. Consequently, the change of direction of the tool, as for example, in going from a position perpendicular to the axis of the tool carrier ram to a parallel position, can lead to a change in the efforts necessary for gripping and thus require means to grip and to move oversized tools.

The disposition of the tools according to which their axes are all parallel and included in a same vertical plane parallel to axis of the ram, has for advantage, apart from the fact that it avoids additional movements while moving, that it minimizes the width requirement of the combined machine-tool—tool magazine.

To complete the addition of an intermediary in the transport and tool exchange line of the machine-tool, from the ram to the tool magazine and vice-versa, the applicant has judiciously conceived the said handling module comprises two arms which are each fitted at their ends with a tool gripping mechanism, and which are arranged one on top of the other in a same vertical plane perpendicular to the aforesaid vertical plane of the tool storage. These arms take two positions, i.e.:

a first extended position of loading and unloading tools when the gripping mechanism becomes in line with the axis of the cradle, a second folded position of tool transport when the gripping mechanism moves away from the vertical plane of storage.

This disposition enables to move two tools at the same time or at least to keep one gripping mechanism free from the engagement of a tool presented by the transfer module.

In combination with the doubling of gripping mechanisms of the handling module, the applicant has conceived a transfer module with two gripping means. This disposition where the transfer module has two gripping means has not only the advantage of being able to ensure the gripping of the tool having just been used and to present by way of a second gripping means the tool to be used in the next machining stage in the same movement of the transfer module coming in its exchange zone towards the ram, but also to allow limiting the duration of tool exchanges between the two transfer and handling modules.

Limiting the duration of the exchange between the different modules reduces the number of operations despite adding an intermediary element. Thus, the storage device of the invention comprising the following three modules, a storage module, a handling module and, a tool transfer module, the said handling and transfer modules being each fitted with two gripping means is remarkable in that it satisfies both the criteria for the capacity relating to the number of tools and also to the speed of loading and unloading the tools.

This device which provides optimal satisfaction in relation to the new criteria created by high speed machining, leads to, in view of its new and inventive conception, a particularly new and inventive operating process of which the different stages will be defined in the following description.

Although, the fundamental concepts of the invention have just been detailed hereinabove in their most elementary form, more details and characteristics of the invention will come out more clearly when reading the description hereinafter using, as a non limitative example and having regard to the attached drawings, an embodiment of a tool storage and tool exchange device according to the invention.

BRIEF DESCRIPTION OF THE DRAWINGS

FIGS. 2a, 2b, 2c, 2d, 2e, 2f, 2g are schematic front views of the combined machining machine-tool—storage device with the storage device placed on its left side against the frame of a machining machine-tool; these figures illustrate the movements and functions of tool exchanges and tool transfers between the different modules of the device in accordance with the invention.

DETAILED DESCRIPTION OF THE PREFERRED EMBODIMENTS

Figure 1:
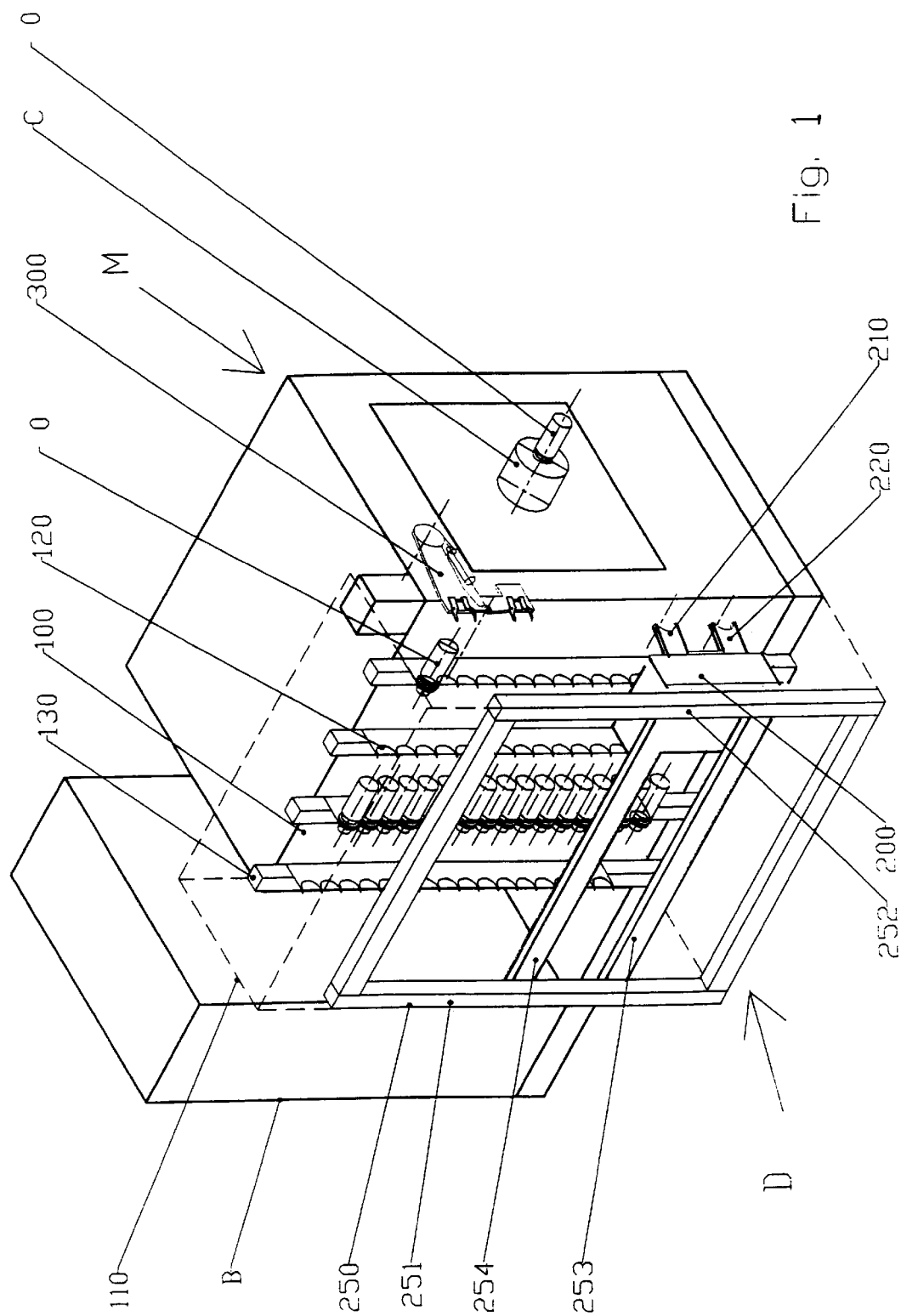
FIG. 1 is a general schematic view of a tool storage and tool exchange device, in accordance with the invention, placed on its right side against the frame of a high speed machine-tool.

As illustrated on the drawing of FIG. 1, the tool storage and tool exchange device of the invention referred to as D as a whole for a high speed machining machine-tool M comprising a horizontal ram C receiving a tool O at its end, is made up of the following parts:

a tool storage module 100 comprising, inside a sealed chamber 110 (shown in broken lines), a multiplicity of aligned housings 120 receiving tools O so that the axes of the tools are parallel with the axis of the ram C and are part of a same vertical storage plane, a handling module 200 which, moving in a vertical plane which is parallel with the vertical plane of the storage of tools O, ensures loading or unloading of at least one tool O in a housing 120 and its transport in the aforesaid chamber 110, along a direction parallel with the axis of ram C, from its housing 120 towards an exchange zone with a third module 300 and vice-versa, and a transfer module 300 which ensures the transport of the tool O present in the ram C towards the exchange zone with the handling module 200 to transmit the tool to it, and vice-versa.

According to the invention, the said housings 120 of the aforesaid storage module 100 are each constituted by a cradle which, accessible on one side, holds tool O by gravity. The use of gravity to ensure the holding of the tools enables avoiding having any gripping means in the storage module 100.

Also, according to a preferred but non limitative illustrated embodiment, the said cradles 120 are arranged on the vertical plane on which they are fixed according to the same distance between two axes in height and the same separation along the length. This particular disposition has for advantage to offer a storage module 100 which is one hundred per cent dedicated to tools 0 of a certain diameter, while still allowing the storage of bigger tools in freeing the adjacent cradles 120.

As illustrated, when the machining machine-tool M comprises a frame B of mainly parallelepiped shape, the said cradles 120 are fixed advantageously by means of their closed side to a lateral side of the frame B of the aforesaid machining machine-tool M. This characterisitic combined with the disposition in a same vertical plane and parallel with the axis of the ram of the tools axes are such that the presence of a high capacity storage module 100 does not increase by much the width of the combination.

According to a particularly advantageous characteristic of the invention, the said cradles 120 are open on their top and take the shape of an arc of a circle of which the bisecting line of the angle formed by both ends of the arc and the center of the cradle 120 is tilted along an angle $\alpha$ in relation to the horizontal axis of the said cradle 120. The object of this tilting is to ease by gravity the holding of the tools present in the said storage module. According to a preferred but non limitative embodiment and such as illustrated, angle $\alpha$ is equal to 15° in absolute value.

According to the illustrated embodiment, storage module 100 is constituted by four vertical uprights 130 on which are fixed the closed sides of the cradles 120 thus forming some vertical ramps, for storing the tools, integral with a side of the frame of machine-tool M. Each ramp being independent, it is easy to imagine that such ramps can be added, removed, brought nearer or further so as to offer a very evolutionary storage module 100.

The applicant has also conceived, for the storage device D of the invention, an interface with the outside, i.e this interface allows to add, remove or exchange the tools in the storage module 100. In order to fulfill this function which is not illustrated, a first solution involves one part of the cradles 120 of the said storage module 100 being mounted moveable and integral with an opening device so that, when set in motion the said moveable cradles can be accessible from the outside of the chamber 110 of the said storage module 100 and can allow either loading, unloading or the exchange of the tools 0 from outside by the operator or an automatic device. Thus, when a tool must be replaced, handling module 200 removes it from the housing in which it is stored and takes it towards a detachable housing so that this tool is removed from the sealed chamber 110 of the storage module and is replaced or not by a new tool. According to a preferred embodiment, these cradles are mounted on slide blocks guiding them in a translatory movement towards the outside like the movement of a drawer. It is of course the independence of each module which allows the changing or replacement of tools during the machining process.

According to a second solution, a part of the cradles is detachable in that the said cradles are integral with a removable case which can move back and forth in the chamber 110 of the said storage module 100 so as to allow either loading, unloading or exchange of tools from the outside. This solution is particularly suited for changing or replacing tools O by means of an automated arm or at least by an automated device but can easily be put into place by an operator.

According to a particularly judicious technical disposition, the base of the chamber 110 of the storage module is constituted by a swarfs collecting device.

According to the invention, the said handling module 200 comprises two arms 210 and 220 which, each fitted at its end with a gripping mechanism 230 and 240 of the tools O, are arranged one on top of the other in a same vertical plane perpendicular with the aforesaid vertical tool storage plane, the said arms 210 and 220 taking up two positions i.e.:

a first extended position of loading and unloading tools O when the gripping mechanism 230 or 240 comes in line with the axis of the cradle 120, a second folded position of transporting tools O when the gripping mechanism 230 or 240 moves away from the vertical storage plane.

According to the preferred embodiment illustrated with more details on the FIG. 2, the two arms 210 and 220 are moved simultaneously by a one and same actuator. The simultaneous movement of both arms from a folded or a transport position, during which the gripping mechanisms 230 and 240 are separated from the vertical storage plane, to an extended position in which the gripping means are positioned, in order to be in line with the cradles 120 and vice-versa, by a one and same actuator has for advantage to reduce the number of components as well as to simplify the working of such a handling module 200.

In addition, in order to adapt to the particular disposition of the opening of the cradles 120, the simultaneous travel of both arms 210 and 220 of the aforesaid handling module 200 is achieved along an angle $(-\alpha)$ in relation to the horizontal so that it can at its best come to take and to drop the tools O in the cradles 120.

Both gripping mechanisms 230 and 240 placed respectively at the end of arms 210 and 220 have the advantage of being controlled separately.

Therefore, even though the setting in motion of the arms 210 and 220 is simultaneous, the engaging or freeing of the tools by the gripping mechanisms 230 and 240 is controlled independently from one gripping mechanism to another.

In refering to the drawing on FIG. 1, it will be noticed that the said handling module 200 comprises a subset of setting in motion ensuring movements in a straight line in a vertical plane parallel with the tool storage plane, by means of a vertical logical structure 250 comprising vertical guide rails 251 and 252 and horizontal rails 253 and 254 on which the handling module 200 moves.

In the eventuality that the specifications of a tool storage and tool exchange device in accordance with the invention would require extremely fast movements for the handling module 200, the applicant has conceived that the said handling module 200 can be driven by linear motors.

A particularly advantageous, but not illustrated, characteristic of the handling device 200 is that the aforesaid gripping mechanisms are in two parts:

an actual clamping part constituted by a clamping device coming to clamp the tool O, and an indexing part ensuring the straightening of the angular positioning of the tool O in relation to its rotation axis.

In this aim, the said clamping device of the aforesaid gripping mechanisms 230 and 240 is made up of on one hand, a fixed tool positioning and resting fork which receives the tool O between both its branches and, on the other hand, a means of keeping it in a mobile position which in order, to close the said clamping device, comes to rest axially on the tool O so as to keep this one in position on the fixed tool positioning and resting fork. Consequently, differing from classical gripping devices, the gripping mechanisms 230 and 240 of the invention, do clamp to ensure via a means of axially resting on the said tools O, to keep the said tools O in position on a fixed fork for resting on of which the branches receive the tool O but do not move to ensure clamping.

The non illustrated indexing part, comprises a plate which, coming into position at the rear end of the tool O engaged in the clamping device of the gripping mechanism 230 or 240, comprises lugs on springs retracting on a filled part of the rear of the tool O engaged in the said clamping device and rising on its hollow part.

According to a particularly judicious choice of conception, the plate of the indexing part is integral with the means to keep in mobile position and ensures the straightening of the angular position of the tool O during the closing movement of the said clamping device.

The angular indexing of the tools O is particularly important. In fact, classically the electric spindle or at least the driving means of the tool O cannot auto-index the angular position of the tool O which it will drive, but can nevertheless always stop in the same position. So, in order to engage tool O, it is necessary that the tools O be presented to ram C along the same angle.

From the moment that the cradles 120 hold the tools O by gravity, it was then particularly important that the handling module 200 angularly index the position of the tool O during its engagement and transport as well as during its unloading. The advantage of the retractability of the angular indexing lugs is that they do not interfere with the clamping of the tool O when the said tool does not have a hollow part at its rear end.

In addition, due to the fact that the fork of the gripping mechanisms 230 and 240 stays fixed, the centering of the tool O in relation to the axis of the cradle made up by this fork can be judiciously executed by means of a centering cone integral with the aforesaid means to keep in position coming to rest on the rear of the tool O during the closing of the clamping device.

As the handling module 200 always takes, transports and presents the tools O along the same angle, the transfer module 300 must respect this criterion by moving the tools O from its exchange zone with the handling module 200 to its exchange zone with the ram C.

According to the invention, the said transfer module 300 comprises two gripping means 310 and 320 which, coming to face the gripping mechanisms 230 and 240 of the aforesaid handling module 200, in the exchange zone of the latter, to receive the tool O to be used and give back the tool O having just been used, take up in the exchange zone with the ram C and in the plane perpendicular with the rotation axis of the tools O, at least one position so as to receive the tool O having just been used and present the tool O to be used in a same angular position in the exchange zone with the ram C and in a perpendicular plane with the rotation axis of the tool O.

As illustrated, a first gripping means 310 of the aforesaid transfer module 300 adopts a rotation path about a first fixed point A integral with the frame B and a second gripping means 320 takes up a movement which, controlled by the revolving movement of the first gripping means 310 ensures a change of angular positioning of the said second gripping means 320 in relation to the first one 310.

In fact, to save space in the machining zone, the tool carrier ram C of the machining machine-tool M stays fixed in the movements plane perpendicular with the axis of rotation of the tools O during tool exchange. The fixed position of the ram C during the tool exchange stages thus requires that both gripping means 310 and 320 of the transfer device 300 come into position exactly in the same way one after the other in the exchange zone with the ram C.

Figure 2B:
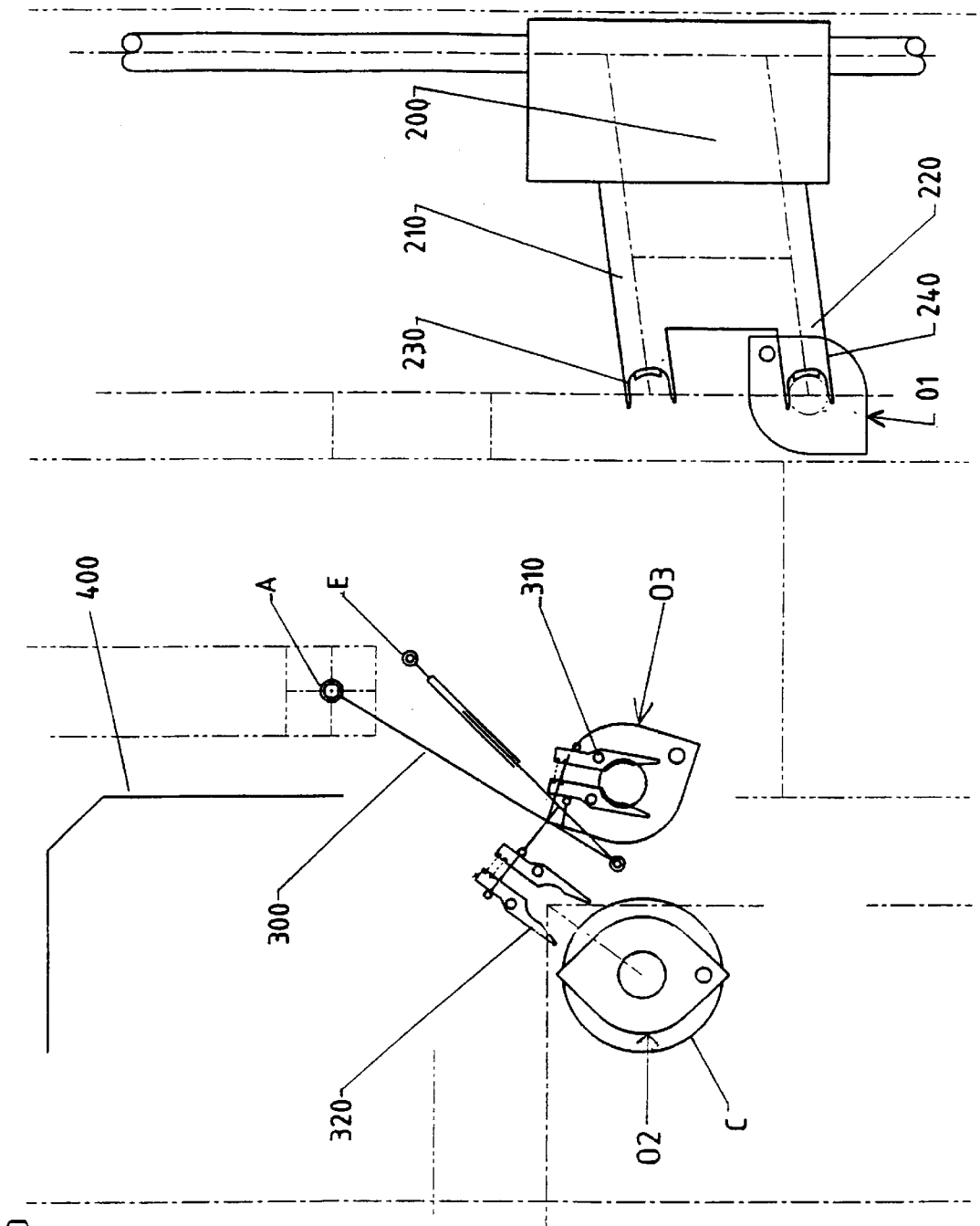

Furthermore, as illustrated on the drawing of FIG. 2b, the rotation movement of the said transfer module 300 is combined with a translatory movement of a protection hood 400 separating the exchange zone between the handling module 200 and the transfer module 300 of the machining zone.

As illustrated on the drawing of FIG. 2a, the said second gripping means 320 of the transfer module 300 is integral with a plate 321 pivotally mounted in relation to the first gripping means 310, the said plate 321 being slidingly connected with a slide bar 322 pivotally mounted about a second fixed point E of the frame B, the separation between the aforesaid pivoting first fixed point A and the aforesaid pivoting second fixed point E being such that the gripping means 310 and 320 are angularly oriented one in relation to the other so that both gripping means 310 and 320 always keep the same angular orientation on a common point in their path.

The device conceived by the applicant and having been described above adopts an operating process of which the different stages follow the cycle illustrated by the whole of FIGS. 2.

As illustrated on the drawing of FIG. 2a, the handling module 200 is in its transport position and comprises a first free gripping mechanism 230 and a second gripping mechanism 240 with a first tool O1, a machining function is taking place by means of a second tool O2, the transfer module 300 is facing the handling module 200 with a first gripping means 310 holding a third tool O3 facing the first free gripping mechanism 230 of the handling module 200 and with a second free gripping means 320 facing the said second gripping mechanism 240 holding the first tool O1.

The drawing on FIG. 2b illustrates an intermediary position when the handling module 200 moves away from the exchange zone with the transfer module 300 so as to put in the cradle the first tool O1. With this aim, the two arms 210 and 220 ensure a tilting movement translatory towards the storage module 100; the first gripping mechanism 230 staying in open position, the second gripping mechanism 240 holding the tool O1 opening so as to free the said tool, the protection hood 400 synchronised with the pendulum movement of the transfer module 300 is retracted, the machining is stopped and the ram C moves towards its fixed position for tool exchange at the level of which the free gripping means 320 of the transfer module 300 has taken position.

Figure 2C:
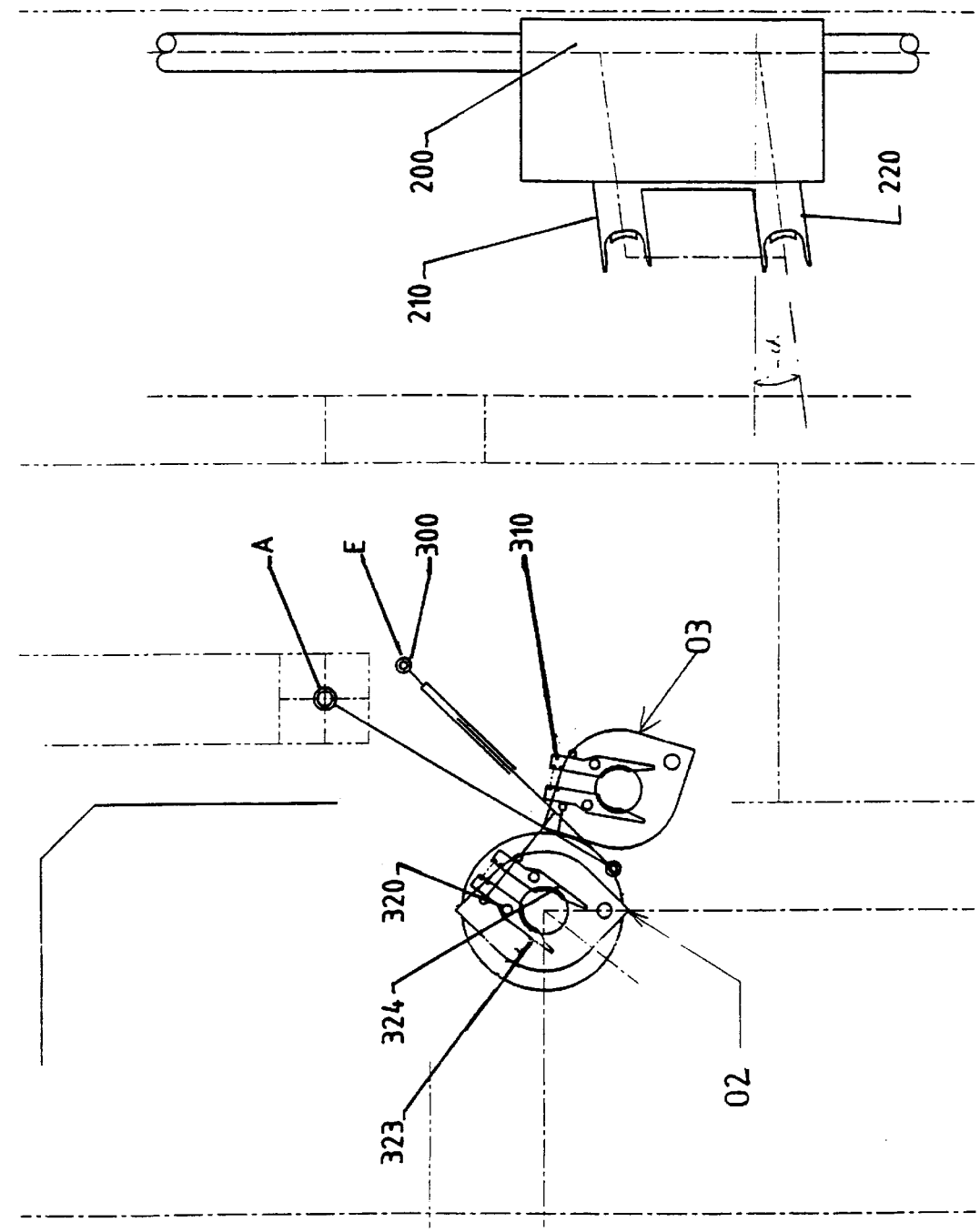

The drawing of FIG. 2c illustrates an intermediary position, during which the two arms 210 and 220 of the handling module 200 are in transport position with their respective gripping mechanisms 230 and 240 free, the handling module 200 being on standby while the ram C has taken its fixed transfer position so that the second tool O2 is engaged with the free gripping means 320 of the transfer module 300 and with the ram C reversing, the said ram C breaks away from the said second tool O2. The transfer module 300 is in the same position as the one illustrated in FIG. 2b, the axis of the ram C being aligned with the axis of the cradle defined by the free gripping means 320 so that the two branches 323 and 324 close themselves on the tool O2 on a surface destined for the gripping of the tools O.

Figure 2D:
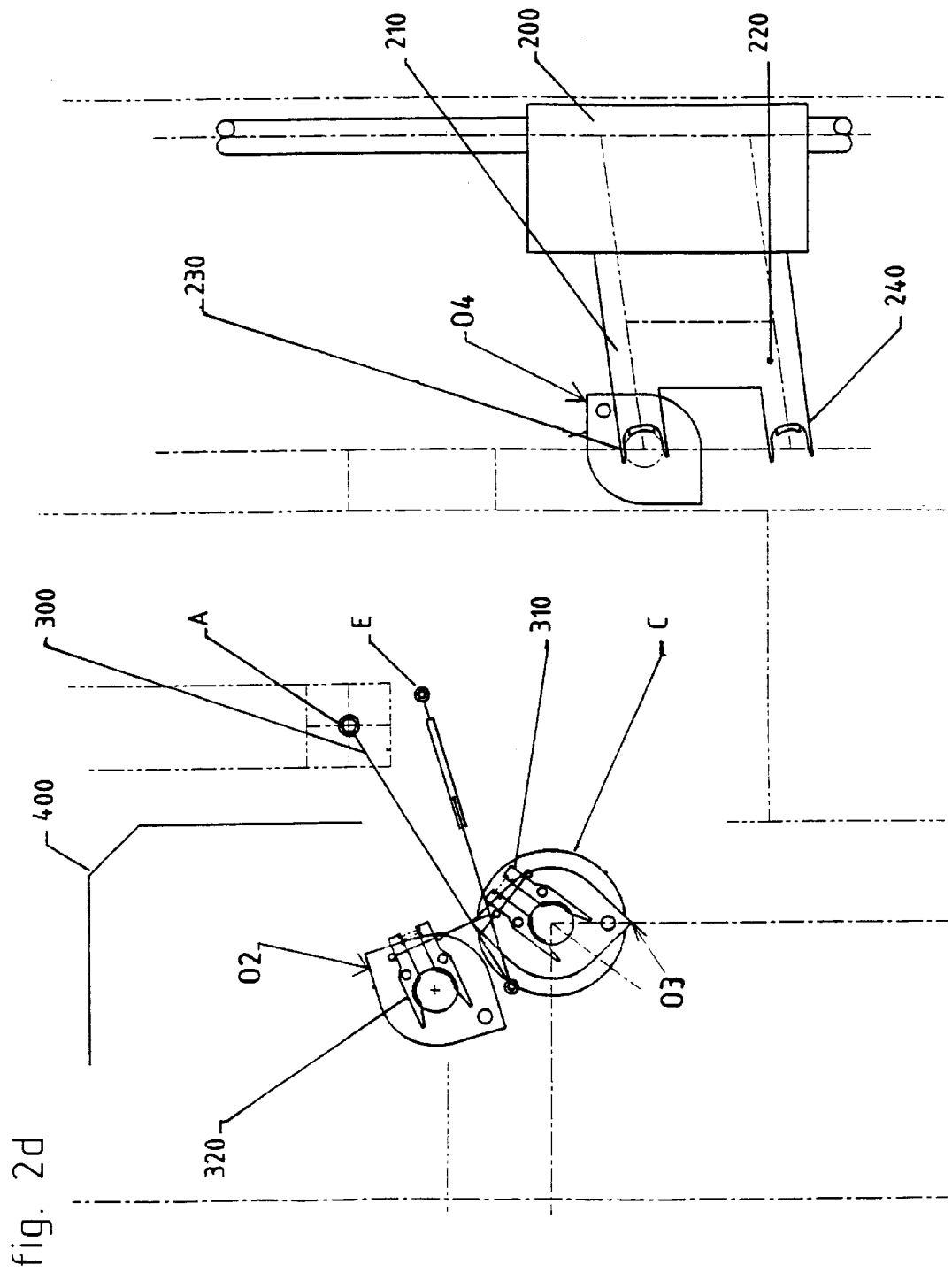

FIG. 2d illustrates an intermediary position in which the handling module 200 moves and opens its arms 210 and 220 while controlling its first gripping mechanism 230 to make it engage with a fourth tool O4, the second gripping mechanism 240 staying free, while the transfer module 300 tilts to present the third tool O3 in fixed tool exchange position so that with the ram C moving forward it comes integral with the third tool O3. The gripping means 310 places the third tool O3 in line with the axis of the ram C and in the same angular position as the second tool O2 when it stops.

Figure 2E:
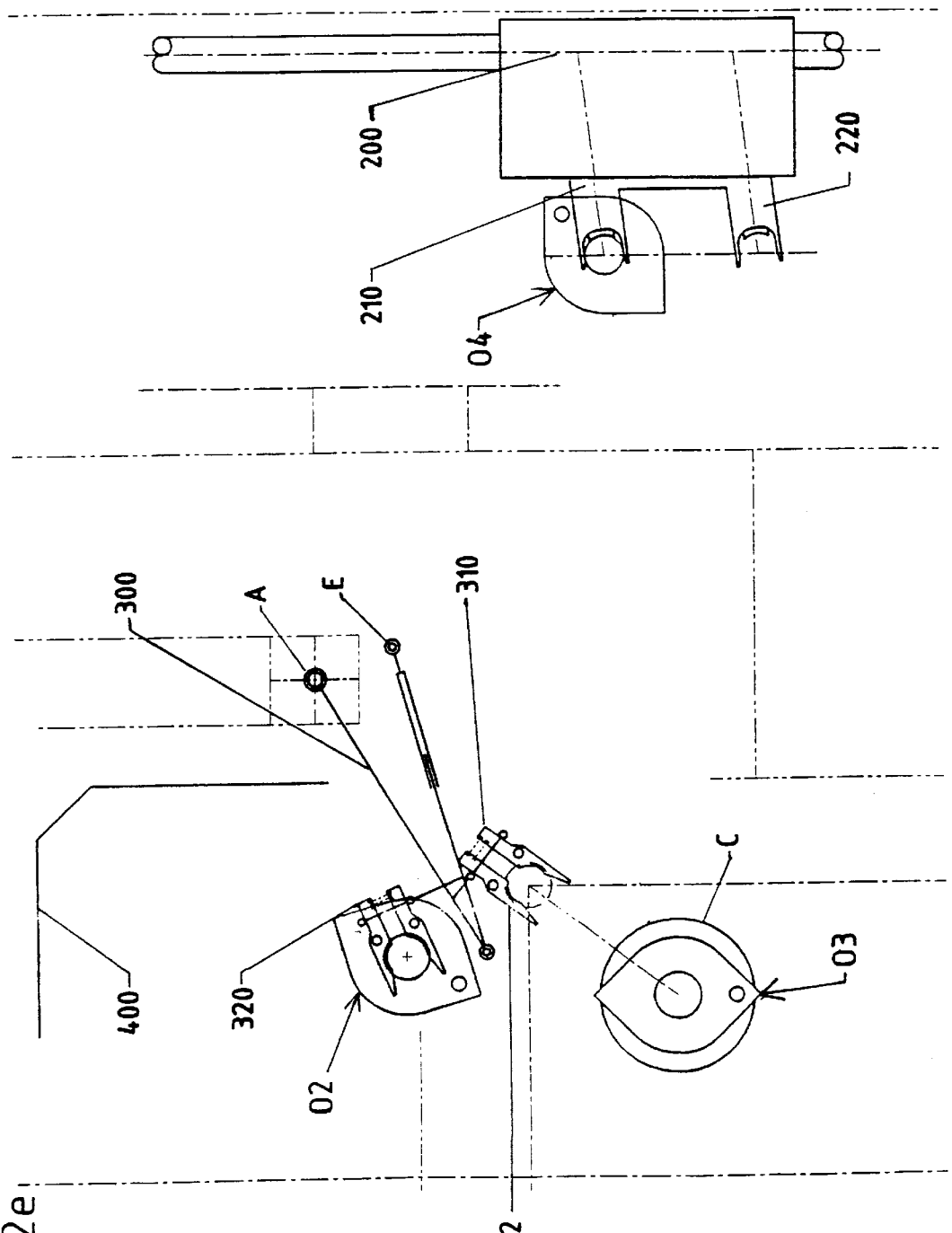

FIG. 2e illustrates an intermediary position in which, the arms 210 and 220 of the handling module 200 come back in transport position so that the said handling module 200 brings the fourth tool O4 of the storage module 100 towards the exchange zone of the handling module 200 with the transfer module 300 while the ram C frees the third tool by moving along a plane perpendicular to the rotation axis of the tools O.

Figure 2F:
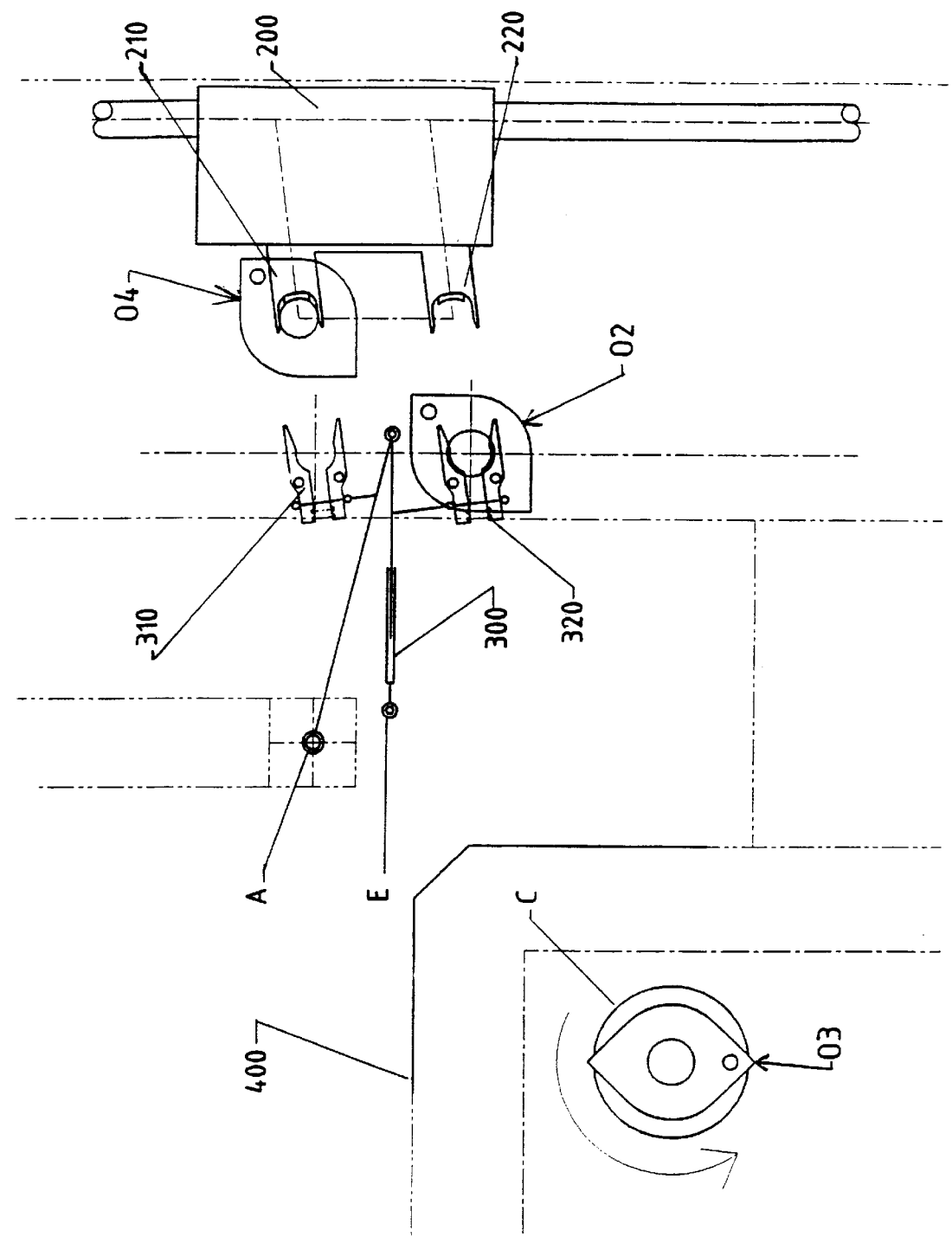

FIG. 2f illustrates a position in which, the handling module 200 is in transport position in its exchange zone with the transfer module 300 with the fourth tool O4 in its first gripping mechanism 230, while the transfer module 300 tilts from its exchange zone with the ram C towards its exchange zone with the handling module 200 with the second tool O2 in its second gripping means 320 and so that the first 310 and the second 320 gripping means of the transfer module 300 face respectively the first 230 and the second 240 gripping mechanisms of the handling module 200, the tilting causing the protection hood 400 to fit back in place, a machining function starting with the third tool O3.

Figure 2G:
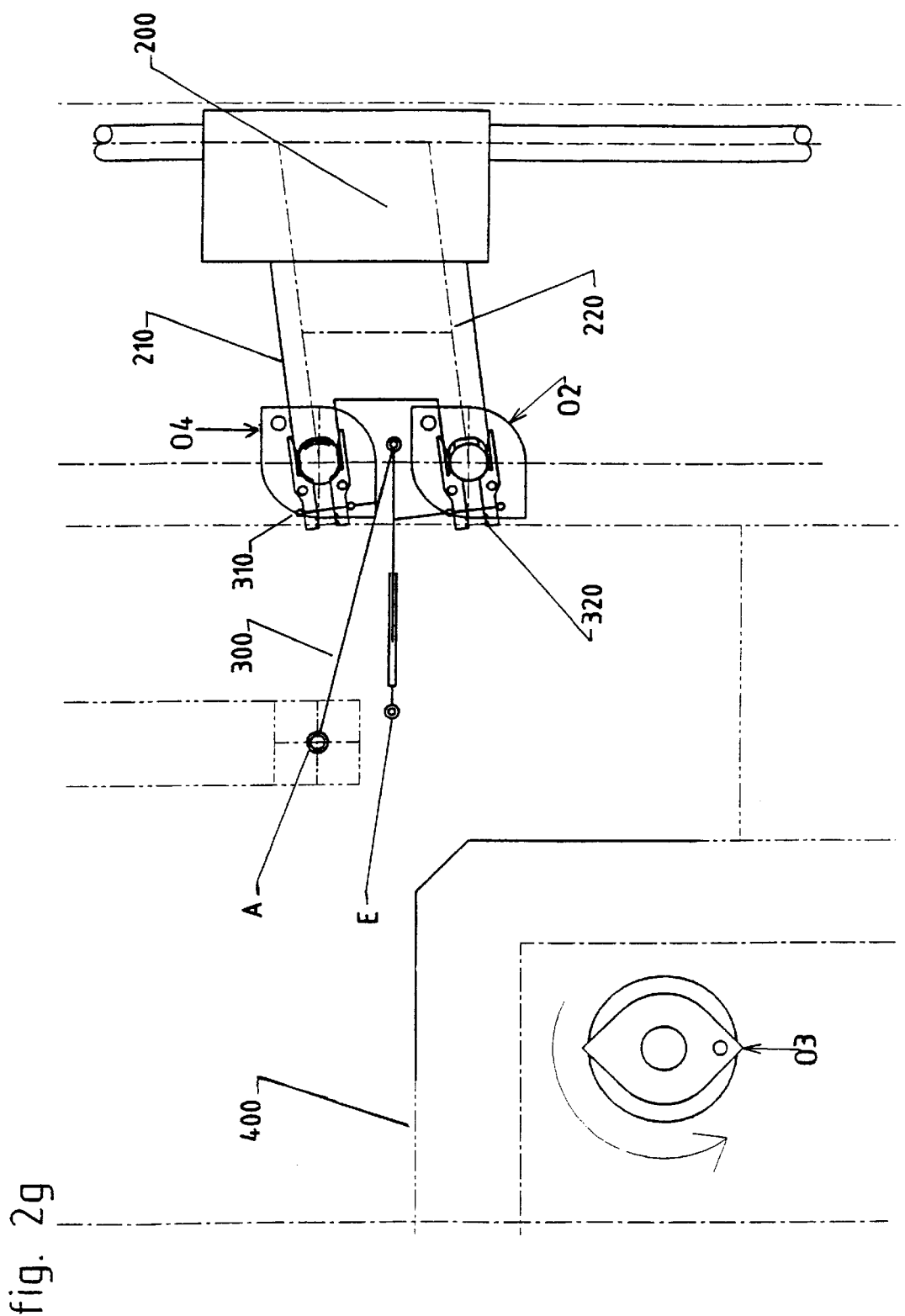

FIG. 2g illustrates an intermediary situation in which, the handling module opens its arms 210 and 220 so that the fourth tool O4 present in the first gripping mechanism 230 comes engaged with the first gripping means 310 of the transfer module 300 and that the second tool O2 engaged in the second gripping means 320 enters in the second gripping mechanism 240 of the handling module 200, the latter then controlling the opening of the first gripping mechanism 230 and the closing of the second gripping mechanism 240 so that when the handling module 200 goes back in its transport position, the second tool O2 is present in the second gripping mechanism 240 and the fourth tool O4 is engaged with the first gripping means 310 of the transfer module 300, while a machining function is taking place with the third tool O3 reproducing the initial situation illustrated by the drawing on FIG. 2a.

It is understood that the description and illustration just given hereinabove of the tool storage and tool exchange device of a machining machine tool and operating process of such a device are given for the purpose of disclosure and not limitation. It is obvious that various arrangements of, as well as modifications and improvements to, the example here above will be possible without departing from the scope of the invention taken in its broadest aspects and spirit.

What is claimed is:

1. Tool storage and tool exchange device of a high speed machine-tool that has a horizontal ram receiving a tool on its end, comprising:
    a tool storage module comprising, inside a chamber, a multiplicity of aligned housings configured to store tools so that axes of said tools are parallel with a ram axis;
    a handling module configured to load and unload at least one tool in at least one respective aligned housing and transport said at least one tool in said chamber along a direction parallel to the ram axis between said respective aligned housing and a handling module exchange zone, said handling module including two gripping mechanisms; and
    a transfer module configured to transport the at least one tool between a ram exchange zone and the handling module exchange zone, said transfer module including two gripping mechanisms,
    wherein said two gripping mechanisms of said handling module are oriented to face said two gripping mechanisms of said transfer module in the handling module exchange zone.

2. Device according to claim 1, wherein the aligned housings of the tool storage module each comprise a cradle configured to be accessible on one side and hold a respective tool by gravity.

3. Device according to claim 2, wherein:
    the machine-tool comprises a frame substantially parallelepiped in shape; and
    the cradles are fixed to a lateral side of the frame of the machine-tool.

4. Device according to claim 2, wherein the cradles are open on top and have a cross-section in the shape of an arc of a circle, the bisecting line of an angle formed by ends of the arc and a center of the circle being tilted along an angle α relative to the horizontal axis of the cradle.

5. A tool storage and tool exchange device comprising:
    means for collecting a to-be-used tool from a tool storage, said means for collecting including two gripping mechanisms;
    first means for transporting said means for collecting and said to-be-used tool from a tool storage to a first exchange zone;
    means for taking said to-be-used tool from said means for collecting in said first exchange zone, said means for taking including two gripping mechanisms; and
    second means for transporting said means for taking and said to-be-used tool from said first exchange zone to a ram exchange zone,
    wherein said two gripping mechanisms of said means for collecting are oriented to face said two gripping mechanisms of said means for taking in the first exchange zone.

6. A tool storage and tool exchange device comprising:
    a tool storage module comprising a plurality of housings configured to store a plurality of tools;
    a handling module configured to unload a particular tool from a particular housing and transport said particular tool from said particular housing to a handling module exchange zone; and
    a transfer module configured to receive said particular tool from said handling module in said handling module exchange zone, transport said particular tool from said handling module exchange zone to a ram exchange zone, and load said particular tool into a ram,
    wherein said handling module comprises:
    a first arm including a first tool gripper, said first arm configured to remove a to-be-used tool from said tool storage module and present said to-be-used tool to said transfer module; and
    a second arm including a second tool gripper, said second arm configured to remove a used tool from said transfer module and present said used tool to said tool storage module, and wherein said first tool gripper and said second tool gripper each comprise an indexer configured to straighten an angular position of a tool in a respective tool gripper.

7. Tool storage and tool exchange device of a high speed machine-tool that has a horizontal ram receiving a tool on its end, comprising:

a tool storage module comprising, inside a chamber, a multiplicity of aligned housings configured to store tools so that axes of said tools are parallel with a ram axis;

a handling module configured to load and unload at least one tool in at least one respective aligned housing and transport said at least one tool in said chamber along a direction parallel to the ram axis between said respective aligned housing and a handling module exchange zone; and a transfer module configured to transport the at least one tool between a ram exchange zone and the handling module exchange zone, wherein the handling module comprises two arms each fitted at an arm end with a tool gripping mechanism and arranged in a same vertical plane, said arms being configured to take one of a first extended position for loading and unloading tools when the tool gripping mechanism is in line with an axis of a housing and a second folded position for tool transport when the tool gripping mechanism moves away from a vertical plane of storage.

8. Device according to claim 7, further comprising an actuator configured to simultaneously move the two arms.

9. Device according to claim 7, wherein both tool gripping mechanisms are controlled separately.

10. Device according to claim 8, wherein the simultaneous travel of both arms of the handling module occurs along an angle relative to the horizontal.

11. Device according to claim 7, wherein the tool storage and tool exchange device comprises vertical guide rails and horizontal rails on which the handling module is configured to move.

12. Device according to claim 7, wherein the gripping mechanisms each comprise:

a clamping part configured to clamp the tool; and an indexing part configured to straighten the angular position of the tool.

13. Device according to claim 12, wherein each clamping part of the gripping mechanisms comprises:

a fixed tool positioning and resting fork configured to receive the tool between both its branches; and a mobile tool pressing member configured to rest axially on the tool to keep the tool in a position on the fixed tool positioning and resting fork.

14. Device according to claim 13, wherein the indexing part comprises a plate configured to contact a rear end of the tool engaged in the clamping device of the gripping mechanism; and lugs on springs, said springs being configured to retract when presented a solid tool rear and to extend when presented a hollow tool rear.

15. Device according to claim 14, wherein the plate of the indexing part is integral with the mobile tool pressing member and is configured to straighten the angular position of the tool during a closing movement of the clamping device.

16. Device according to claim 7, wherein the transfer module comprises:

two tool grippers configured to face the tool gripping mechanisms of the handling module in the handling module exchange zone to receive a tool-to-be-used and to return a tool-having-been-used and furthermore configured to assume a position to receive the tool-having-been-used from said ram and present the tool-to-be-used to said ram, said position being in the ram exchange zone and in a plane perpendicular to the rotation axis of a tool being rotated by said ram.

17. Device according to claim 14, wherein:

said tool storage and tool exchange device further comprises a ram configured to remain fixed in a movement plane perpendicular to the axis of rotation of a tool being rotated by said ram; and said transfer module comprises a first tool gripper configured to adopt a revolving movement about a first fixed point integral with a machine-tool frame, and a second tool gripper configured to undergo a movement determined by the revolving movement of the first tool gripper, said movement changing an angular position of the second tool gripper relative to the first tool gripper.

18. Device according to claim 15, further comprising a protection hood separating said handling module and said transfer module and configured to undergo a translatory movement, wherein the rotation movement of the transfer module is combined with said translatory movement.

19. Device according to claim 17, further comprising:

a plate pivotally mounted at a first fixed point in relation to the first tool gripper;

a slide bar slidingly connected with said plate and pivotally mounted about a second fixed point of the frame, wherein:

a separation distance between the first fixed point and the second fixed point being chosen to maintain the first tool gripper and the second tool gripper at a same angular orientation at a common point.

20. A tool storage and tool exchange device comprising:

a tool storage module comprising a plurality of housings configured to store a plurality of tools;

a handling module configured to unload a particular tool from a particular housing and transport said particular tool from said particular housing to a handling module exchange zone; and a transfer module configured to receive said particular tool from said handling module in said handling module exchange zone, transport said particular tool from said handling module exchange zone to a ram exchange zone, and load said particular tool into a ram, wherein said handling module comprises:

a first arm including a first tool gripper, said first arm configured to remove a to-be-used tool from said tool storage module and present said to-be-used tool to said transfer module; and a second arm including a second tool gripper, said second arm configured to remove a used tool from said transfer module and present said used tool to said tool storage module, and wherein said transfer module comprises two gripping mechanisms that are oriented to face said first tool gripper and said second tool gripper of said handling module in the handling module exchange zone.

21. A tool storage and tool exchange device comprising:

a tool storage module comprising a plurality of housings configured to store a plurality tools;

a handling module configured to unload a particular tool from a particular housing and transport said particular tool from said particular housing to a handling module exchange zone, said handling module including two gripping mechanisms; and a transfer module configured to receive said particular tool from said handling module in said handling module exchange zone, transport said particular tool from said handling module exchange zone to a ram exchange zone, and load said particular tool into a ram, said transfer module including two gripping mechanisms, wherein said two gripping mechanisms of said handling module are oriented to face said two gripping mechanisms of said transfer module in the handling module exchange zone.

22. The tool storage and tool exchange device according to claim 21, wherein said tool storage module further comprises:

a plurality of storage housings configured to store a plurality of tools.

23. The tool storage and tool exchange device according to claim 22, wherein said plurality of storage housings are aligned.

24. The tool storage and tool exchange device according to claim 22, wherein said plurality of storage housings are aligned parallel with a ram tool axis.

25. The tool storage and tool exchange device according to claim 22, wherein said plurality of storage housings are aligned in a same vertical plane.

26. The tool storage and tool exchange device according to claim 22, wherein each of said plurality of storage housings comprises a cradle.

27. The tool storage and tool exchange device according to claim 26, wherein each of said cradles being open on top and having an articular cross-section.

28. The tool storage and tool exchange device according to claim 21, wherein said two gripping mechanisms of said transfer module comprise:

a first tool gripper configured to remove a to-be-used tool from said handling module and present said to-be-used tool to said ram; and a second tool gripper configured to remove a used tool from said ram and present said used tool to said handling module.

29. The tool storage and tool exchange device according to claim 20, wherein said handling module further comprises an actuator configured to simultaneously move said first and said second arm.

30. The tool storage and tool exchange device according to claim 21, further comprising:

vertical guide rails and horizontal rails configured to support said handling module during a movement.

31. The tool storage and tool exchange device according to claim 20, wherein said first tool gripper and said second tool gripper each comprise a clamp configured to clamp a tool.

32. The tool storage and tool exchange device according to claim 21, further comprising a protection hood separating said handling module and said transfer module and configured to undergo a translatory movement.

* * * * *